(12) United States Patent
Takahagi et al.

(10) Patent No.: US 10,128,471 B2
(45) Date of Patent: Nov. 13, 2018

(54) BATTERY-PACKAGING MATERIAL

(71) Applicant: DAI NIPPON PRINTING CO., LTD., Tokyo (JP)

(72) Inventors: Atsuko Takahagi, Tokyo (JP); Hirohisa Akita, Tokyo (JP); Sumito Nishida, Tokyo (JP); Rikiya Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 172 days.

(21) Appl. No.: 15/100,888

(22) PCT Filed: Dec. 1, 2014

(86) PCT No.: PCT/JP2014/081718
§ 371 (c)(1),
(2) Date: Jun. 1, 2016

(87) PCT Pub. No.: WO2015/083657
PCT Pub. Date: Jun. 11, 2015

(65) Prior Publication Data
US 2016/0301040 A1 Oct. 13, 2016

(30) Foreign Application Priority Data

Dec. 2, 2013 (JP) ................................. 2013-249217
Sep. 19, 2014 (JP) ................................. 2014-191069

(51) Int. Cl.
*H01M 2/02* (2006.01)
*B32B 7/12* (2006.01)
(Continued)

(52) U.S. Cl.
CPC ............. *H01M 2/0287* (2013.01); *B32B 7/12* (2013.01); *B32B 15/088* (2013.01); *B32B 15/09* (2013.01);
(Continued)

(58) Field of Classification Search
None
See application file for complete search history.

(56) References Cited

U.S. PATENT DOCUMENTS

2012/0268073 A1* 10/2012 Morioka ................ B21D 13/04
320/128
2013/0029140 A1* 1/2013 Takao ...................... H01G 9/08
428/336

FOREIGN PATENT DOCUMENTS

JP S61-250153 A 11/1986
JP 2002-56824 A 2/2002
(Continued)

OTHER PUBLICATIONS

JP 2008-053133 A Machine English Translation.*
(Continued)

*Primary Examiner* — Scott J. Chmielecki
(74) *Attorney, Agent, or Firm* — Oliff PLC

(57) ABSTRACT

To provide a technique for a battery-packaging material made of a film-form laminate in which at least a base material layer, an adhesive layer, a metal layer, and a sealant layer are laminated successively, wherein: electrolytic solution resistance is further improved by including a polyester film in the base material layer; cracks and pinholes are less likely to be created at the time of forming the polyester-film-including base material layer; and formability is improved. This battery-packaging material is made of a laminate in which at least a base material layer, an adhesive layer, a metal layer, and a sealant layer are laminated successively, wherein: the base material layer includes a polyester film; and the metal layer is an aluminum foil in which the 0.2% proof stress at the time of performing a tensile test in a direction parallel to the rolling direction is from 55 to 140 N/mm$^2$.

19 Claims, 2 Drawing Sheets

(51) Int. Cl.
  *B32B 15/088* (2006.01)
  *B32B 15/09* (2006.01)
  *B32B 15/20* (2006.01)
  *B32B 27/08* (2006.01)
  *B32B 27/34* (2006.01)
  *B32B 27/36* (2006.01)
  *H01M 10/0525* (2010.01)

(52) U.S. Cl.
  CPC .............. *B32B 15/20* (2013.01); *B32B 27/08* (2013.01); *B32B 27/34* (2013.01); *B32B 27/36* (2013.01); *H01M 2/026* (2013.01); *H01M 2/0262* (2013.01); *H01M 10/0525* (2013.01); *B32B 2255/06* (2013.01); *B32B 2307/54* (2013.01); *B32B 2457/10* (2013.01); *H01M 2/0292* (2013.01); *H01M 2220/20* (2013.01); *H01M 2220/30* (2013.01)

(56) References Cited

FOREIGN PATENT DOCUMENTS

| JP | 2008-053133 A | | 3/2008 |
|---|---|---|---|
| JP | 2008053133 A | * | 3/2008 |
| JP | 2008053133 A | * | 3/2008 |
| JP | 2008-287971 A | | 11/2008 |
| JP | 2008-288117 A | | 11/2008 |
| JP | 2010-277693 A | | 12/2010 |
| JP | 2011-101559 A | | 5/2011 |
| JP | 2011-108450 A | | 6/2011 |
| JP | 2012-033393 A | | 2/2012 |
| JP | 2014-101559 A | | 6/2014 |
| WO | 2011/132545 A1 | | 10/2011 |
| WO | 2012/036181 A1 | | 3/2012 |

OTHER PUBLICATIONS

Dec. 19, 2017 Office Action issued in Japanese Patent Application No. 2013-249217.

Jun. 27, 2017 Office Action issued in Japanese Patent Application No. 2013-249217.

Feb. 10, 2015 International Search Report issued in International Patent Application No. PCT/JP2014/081718.

Akira OTA; "Press Processing Engineering Manual;" Nikkan Kogyo Shimbun, Ltd.; Jul. 30, 1981; pp. 1-3.

* cited by examiner

BATTERY-PACKAGING MATERIAL

TECHNICAL FIELD

The present invention relates to a battery packaging material which has excellent moldability with pinholes and cracks hardly generated during molding and which has excellent electrolytic solution resistance.

BACKGROUND ART

Various types of batteries have been developed heretofore, and in every battery, a packaging material is an essential member for sealing battery elements such as an electrode and an electrolyte. Metallic packaging materials have been often used heretofore as battery packagings.

On the other hand, in recent years, batteries have been required to be diversified in shape and to be thinned and lightened with improvement of performance of electric cars, hybrid electric cars, personal computers, cameras, mobile phones and so on. However, metallic battery packaging materials that have been often used heretofore have the disadvantage that it is difficult to keep up with diversification of shapes, and there is a limit to weight reduction.

Thus, in recent years, there has been proposed a film-shaped laminate with a base material, a metal layer and a sealant layer laminated in this order has been proposed as a battery packaging material which is easily processed into diversified shapes and is capable of achieving thickness reduction and weight reduction. However, such a film-shaped packaging material is thinner as compared to a metallic packaging material, and has the disadvantage that pinholes and cracks are easily generated during molding. If pinholes and cracks are generated in a battery packaging material, an electrolytic solution may permeate to a metal layer to form a metal precipitate, resulting in occurrence of a short-circuit, and therefore it is absolutely necessary that a film-shaped battery packaging material have a property that makes it hard to generate pinholes during molding, i.e. excellent moldability.

Various studies have been conducted heretofore with attention paid to an adhesive layer for bonding a metal layer in order to improve the moldability of a film-shaped battery packaging material. For example, Patent Document 1 discloses that in a laminated packaging material which includes an inner layer including a resin film; a first adhesive agent layer; a metal layer; a second adhesive agent layer; and an outer layer including a resin film, at least one of the first adhesive agent layer and the second adhesive agent layer is formed of an adhesive composition containing a resin having an active hydrogen group on the side chain, a polyfunctional isocyanate and a polyfunctional amine compound, a packaging material having high reliability in deeper molding is obtained.

As represented by Patent Document 1, many studies have been conducted heretofore on techniques for improving moldability with attention paid to blended components of an adhesive layer for bonding a metal layer and other layer in a battery packaging material including a film-shaped laminate, but there have been few reports techniques for improving moldability with attention paid to the properties of a metal layer.

It is known that generally, a metal material having a low yield strength and a large tensile strength is not only easily deformed, but also hardly creased in deep drawing, and thus has excellent processability (see Non-Patent Document 1), and heretofore, a metal raw material having a low yield strength has been generally employed as a metal layer in a battery packaging material including a film-shaped laminate.

Further, a battery packaging material is required to have high electrolytic solution resistance, and for example, by using a polyester film as a base material layer of the battery packaging material, electrolytic solution resistance can be further improved. However, a polyester film is inferior in moldability to a polyamide film etc., and the use of a polyester film as a base material layer causes the problem that pinholes are easily generated during molding. Therefore, when a polyester film is used as a base material layer for improving electrolytic solution resistance, it is particularly difficult to improve the moldability of a battery packaging material.

For improving the moldability of a battery packaging material, a nylon film is widely used as a base material (see, for example, Patent Document 2). However, there is the problem that if an electrolytic solution is deposited on a base material surface in production of a battery using a battery packaging material including a nylon film as a base material, the base material surface is whitened or melted.

On the other hand, as described above, a polyester film (e.g. polyethylene terephthalate (PET) film) excellent in electrolytic solution resistance may be used as a base material for improving the electrolytic solution resistance of a base material surface. However, a polyester film is poor in moldability, and therefore has the problem that pinholes are easily generated during molding.

PRIOR ART DOCUMENTS

Patent Documents

Patent Document 1: Japanese Patent Laid-open Publication No. 2008-287971
Patent Document 2: Japanese Patent Laid-open Publication No. 2008-288117

Non-Patent Document

Non-Patent Document 1: Tetsu Ota, "Press Processing Technical Manual", published by THE NIKKAN KOGYO SHIMBUN, LTD., issued on Jul. 30, 1981, pages 1 to 3

SUMMARY OF THE INVENTION

Problems to be Solved by the Invention

A main object of a first aspect of the present invention is to provide the following technique: a battery packaging material including a film-shaped laminate in which at least a base material layer, an adhesive layer, a metal layer and a sealant layer are laminated in this order has further improved electrolytic solution resistance by including a polyester film in the base material layer, and also has excellent moldability with cracks and pinholes hardly generated during molding of the base material layer including a polyester film.

A main object of a second aspect of the present invention is to provide the following technique: a battery packaging material including a film-shaped laminate in which at least a base material layer, an adhesive layer, a metal layer and a sealant layer are laminated in this order is excellent in electrolytic solution resistance, and has excellent moldability with cracks and pinholes hardly generated during molding.

Means for Solving the Problems

The present inventors have extensively conducted studies for achieving the object of the first aspect of the present invention, and resultantly found that in a battery packaging material including as a metal layer an aluminum foil having a high yield strength with a 0.2% yield strength of 55 to 140 N/mm² when a tensile test is conducted in a direction parallel to a rolling direction, outstandingly excellent moldability can be imparted to the battery packaging material surprisingly even when a base material layer includes a polyester film, so that the ratio of generation of pinholes and cracks during molding can be considerably reduced, although in conventional techniques, an aluminum foil to be used as a metal layer is considered to be more excellent in processability as its yield strength decreases. Further, the battery packaging material is excellent in electrolytic solution resistance because the base material layer to be laminated with the aluminum foil includes a polyester film. The first aspect of the present invention has been completed by further conducting studies based on the above-mentioned findings.

The present inventors have extensively conducted studies for achieving the object of the second aspect of the present invention. As a result, it has been found that when in a battery packaging material including a laminate in which at least a base material layer, an adhesive layer, a metal layer and a sealant layer are laminated in this order, the base material layer is formed of a biaxially stretched film including at least a polyester resin layer and a polyamide resin layer, the tensile rupture elongation of the base material layer in each of the MD direction and the TD direction is set in the range of 85 to 130%, and the ratio of the tensile rupture elongation of the base material layer in the MD direction to the tensile rupture elongation of the base material layer in the TD direction (MD/TD) is set in the range of 1.0 to 1.4, both excellent electrolytic solution resistance and excellent moldability can be achieved in the battery packaging material. The second aspect of the present invention has been completed by further conducting studies based on the above-mentioned findings.

That is, the first aspect of the present invention provides a battery packaging material and a battery of the following aspects.

Item 1A. A battery packaging material including a laminate in which at least a base material layer, an adhesive layer, a metal layer and a sealant layer are laminated in this order, wherein
the base material layer includes a polyester film, and
the metal layer is an aluminum foil having a 0.2% yield strength of 55 to 140 N/mm² when a tensile test is conducted in a direction parallel to a rolling direction.

Item 2A. The battery packaging material according to item 1A, wherein the base material layer includes a laminate of a polyester film and a polyamide film.

Item 3A. The battery packaging material according to item 2A, wherein the laminate of a polyester film and a polyamide film is a laminate of a biaxially stretched polyester film and a biaxially stretched polyamide film.

Item 4A. The battery packaging material according to item 2A, wherein the laminate of a polyester film and a polyamide film is a co-extruded laminate of a polyester resin and a polyamide resin.

Item 5A. The battery packaging material according to any one of items 1A to 4A, wherein the aluminum foil has a 0.2% yield strength of 65 to 90 N/mm² when a tensile test is conducted in a direction parallel to a rolling direction.

Item 6A. The battery packaging material according to any one of items 1A to 5A, wherein the aluminum foil has a thickness of 20 to 55 µm.

Item 7A. The battery packaging material according to any one of items 1A to 6A, wherein at least one surface of the metal layer is subjected to a chemical conversion treatment.

Item 8A. The battery packaging material according to any one of items 1A to 7A, wherein the battery packaging material is a packaging material for a secondary battery.

Item 9A. A battery, wherein a battery element including at least a positive electrode, a negative electrode and an electrolyte is stored in the battery packaging material according to any one of items 1A to 8A.

The second aspect of the present invention provides a battery packaging material and a battery of the following aspects.

Item 1B. A battery packaging material including a laminate in which at least a base material layer, an adhesive layer, a metal layer and a sealant layer are laminated in this order, wherein
the base material layer is formed of a biaxially stretched film including at least a polyester resin layer and a polyamide resin layer,
the tensile rupture elongation of the base material layer in each of the MD direction and the TD direction is in the range of 85 to 130%, and
the ratio of the tensile rupture elongation of the base material layer in the MD direction to the tensile rupture elongation of the base material layer in the TD direction (MD/TD) is in the range of 1.0 to 1.4.

Item 2B. The battery packaging material according to item 1B, wherein the base material layer is formed of a biaxially stretched film formed by co-extruding at least a polyester resin and a polyamide resin.

Item 3B. The battery packaging material according to item 1B or 2B, wherein the base material layer is formed of a biaxially stretched film in which a polyester resin layer, an adhesive resin layer and a polyamide resin layer are laminated in this order.

Item 4B. The battery packaging material according to any one of items 1B to 3B, wherein in the base material layer, the polyester resin layer is situated at an outermost layer on a side opposite to the sealant layer.

Item 5B. The battery packaging material according to any one of items 1B to 4B, wherein the tensile rupture strength of the base material layer in each of the MD direction and the TD direction is 250 MPa or more.

Item 6B. The battery packaging material according to any one of items 1B to 5B, wherein the ratio of the tensile rupture strength of the base material layer in the MD direction to the tensile rupture strength of the base material layer in the TD direction (MD/TD) is in the range of 0.8 to 1.1.

Item 7B. The battery packaging material according to any one of items 1B to 6B, wherein the metal layer is an aluminum foil in which the 0.2% yield strength when a tensile test is conducted in a direction parallel to the MD direction and the 0.2% yield strength when a tensile test is conducted in a direction parallel to the TD direction are each in the range of 55 to 140 N/mm².

Item 8B. The battery packaging material according to any one of items 1B to 7B, wherein at least one surface of the metal layer is subjected to a chemical conversion treatment.

Item 9B. The battery packaging material according to any one of items 1B to 8B, wherein the battery packaging material is a packaging material for a secondary battery.

Item 10B. A battery including a battery element including at least a positive electrode, a negative electrode and an electrolyte, the battery element being stored in the battery packaging material according to any one of items 1B to 9B.

Advantages of the Invention

In a battery packaging material according to the first aspect of the present invention, a metal layer is an aluminum foil having a 0.2% yield strength of 55 to 140 N/mm² when a tensile test is conducted in a direction parallel to a rolling direction, and thus the metal layer can properly follow the shape of a mold during molding, so that generation of pinholes, cracks and the like can be suppressed. Thus, the battery packaging material of the first aspect of the present invention has excellent moldability, and therefore can contribute to improvement of productivity. Further, the battery packaging material is excellent in electrolytic solution resistance because a base material layer to be laminated with the metal layer includes a polyester film.

In a battery packaging material according to the second aspect of the present invention, a base material layer is formed of a biaxially stretched film including at least a polyester resin layer and a polyamide resin layer, the tensile rupture elongation of the base material layer in each of the MD direction and the TD direction is in the range of 85 to 130%, and the ratio of the tensile rupture elongation of the base material layer in the MD direction to the tensile rupture elongation of the base material layer in the TD direction (MD/TD) is in the range of 1.0 to 1.4, so that the battery packaging material has excellent moldability, and therefore generation of pinholes, cracks and the like during molding of the battery packaging material can be suppressed. Further, owing to the above-mentioned configuration, the battery packaging material has excellent electrolytic solution resistance, so that even if an electrolytic solution is deposited on a surface of the base material layer, dissolution etc. of the base material layer can be effectively suppressed.

EMBODIMENTS OF THE INVENTION

A battery packaging material A according to the first aspect of the present invention includes a laminate in which at least a base material layer, an adhesive layer, a metal layer and a sealant layer are laminated in this order, wherein the base material layer includes a polyester film, and the metal layer is an aluminum foil having a 0.2% yield strength of 55 to 140 N/mm² when a tensile test is conducted in a direction parallel to a rolling direction.

A battery packaging material B according to the second aspect of the present invention includes a laminate in which at least a base material layer, an adhesive layer, a metal layer and a sealant layer are laminated in this order, wherein the base material layer is formed of a biaxially stretched film including at least a polyester resin layer and a polyamide resin layer, the tensile rupture elongation of the base material layer in each of the MD direction and the TD direction is in the range of 85 to 130%, and the ratio of the tensile rupture elongation of the base material layer in the MD direction to the tensile rupture elongation of the base material layer in the TD direction (MD/TD) is in the range of 1.0 to 1.4. Hereinafter, the battery packaging material according to the present invention will be described in detail.

Hereinafter, the battery packaging material A according to the first aspect and the battery packaging material B according to the second aspect of the present invention will be described in detail in order.

1A. Laminated Structure of Battery Packaging Material According to First Aspect

Figure 1:
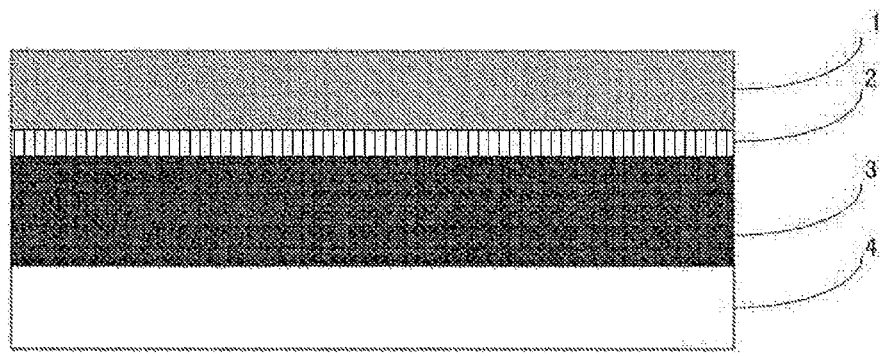
FIG. 1 is a drawing showing one example of a cross-sectional structure of a battery packaging material according to the first aspect of the present invention.

The battery packaging material A according to the first aspect includes a laminate in which at least a base material layer 1, an adhesive layer 2, a metal layer 3 and a sealant layer 4 are laminated in this order as shown in FIG. 1. In the battery packaging material A according to the first aspect, the base material layer 1 is an outermost layer, and the sealant layer 4 is an innermost layer. That is, at the time of assembling a battery, the sealant layer 4 situated on the periphery of a battery element is heat-sealed with itself to hermetically seal the battery element, so that the battery element is encapsulated.

Figure 2:
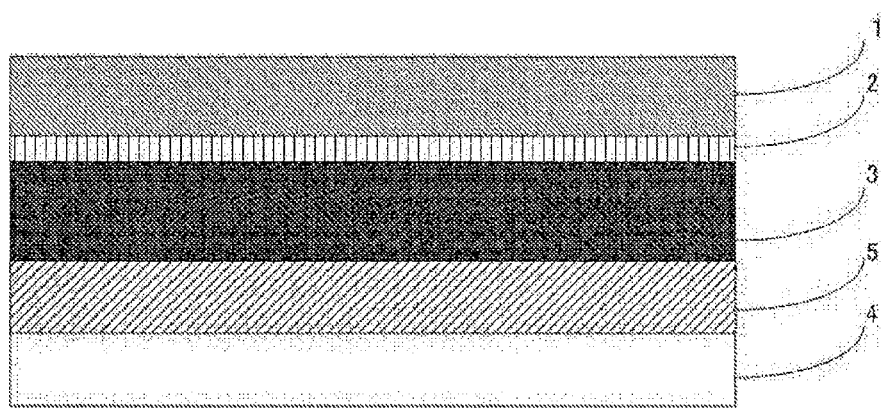
FIG. 2 is a drawing showing one example of a cross-sectional structure of a battery packaging material according to the first aspect of the present invention.

As shown in FIG. 2, the battery packaging material A according to the first aspect may have an adhesive layer 5 provided between the metal layer 3 and the sealant layer 4 as necessary for the purpose of improving adhesion between the layers.

2A. Compositions of Layers that Form Battery Packaging Material a According to First Aspect

[Base Material Layer 1]

In the battery packaging material A according to the first aspect, the base material layer 1 is a layer that forms the outermost layer, and has insulation quality. In the first aspect, the base material layer 1 includes a polyester film. Specific examples of the polyester resin that forms the polyester film include polyethylene terephthalate, polybutylene terephthalate, polyethylene naphthalate, polybutylene naphthalate, copolyester and polycarbonate. For imparting excellent moldability and electrolytic solution resistance to the battery packaging material A, the polyester film is preferably a biaxially stretched polyester film, more preferably a biaxially stretched polyethylene terephthalate film. A biaxially stretched polyester film such as a biaxially stretched polyethylene terephthalate film is known, and a method for production thereof is also known. Specifically, a biaxially stretched polyester film can be obtained, for example, in the following manner: an unstretched raw film composed of a raw material containing a polyester is biaxially stretched under the condition of a draw ratio of 2.0 to 6.0 in each of the machine direction (MD) and the vertical direction (TD), and then heat-treated at 210 to 230° C. As a method for biaxially stretching the film, simultaneous biaxial stretching or sequential biaxial stretching by a tubular method or a tenter method may be employed.

More preferably, the base material layer 1 includes a laminate of a polyester film and a polyamide film for further improving the moldability and electrolytic solution resistance of the battery packaging material A. When the base material layer 1 includes a laminate of a polyester film and a polyamide film, it is preferred that in the battery packaging material A, the polyamide film is situated on the later-described sealant layer 4 side for improving electrolytic solution resistance. As the polyester film in the laminate, one as described above is used. The polyamide resin that forms the polyamide film is preferably a nylon resin. Specific examples of the nylon resin include nylon 6, nylon 6,6, copolymers of nylon 6 and nylon 6,6, nylon 6,10 and polymethaxylylene adipamide (MXD nylon). For imparting excellent moldability and excellent electrolytic solution resistance to the battery packaging material A, the polyamide film is preferably a biaxially stretched polyamide film, more preferably a biaxially stretched nylon film. A biaxially stretched polyamide film such as a biaxially stretched nylon film is known, and a method for production thereof is also known. Specifically, a biaxially stretched polyamide film having the above-mentioned properties can be obtained, for example, in the following manner: an unstretched raw film composed of a raw material containing a polyamide is biaxially stretched under the condition of a draw ratio of 3.0 to 3.5 in each of the machine direction (MD) and the vertical direction (TD), and then heat-treated at 150 to 200° C. As a method for biaxially stretching the film, simultaneous biaxial stretching or sequential biaxial stretching by a tubular method or a tenter method may be employed, and simultaneous biaxial stretching by a tubular method is preferred.

The laminate of a polyester film and a polyamide film is especially preferably in the form of a laminate of a biaxially stretched polyester film and a biaxially stretched polyamide film or a co-extruded laminate of a polyester resin and a polyamide resin for further improving the moldability and electrolytic solution resistance of the battery packaging material A. For example, a biaxially stretched polyester film and a biaxially stretched nylon film can be laminated with an adhesive interposed therebetween using a known method such as a dry lamination method or a sandwich lamination method. For the laminate of a polyester resin and a nylon resin, the polyester resin and the nylon resin can be coextruded to be laminated with an adhesive layer interposed therebetween. The kind, amount and the like of the adhesive layer used are similar to those in the case of the later-described adhesive layer 2 or adhesive layer 5.

The base material layer 1 may be formed of at least one of the above-mentioned polyester film and the above-mentioned laminate, or may further include other resin film layer. In the base material layer 1, the above-mentioned polyester film and the above-mentioned laminate may each have only one layer, or a plurality of layers. Examples of the other resin that forms the other resin film layer include epoxy resins, acrylic resins, fluororesins, polyurethane resins, silicon resins, phenol resins, and mixtures and copolymers thereof. Examples of the resin that forms the other resin film layer include mixtures and copolymers of any of the above-mentioned other resins and at least one of a polyester resin and a polyamide resin.

In the base material layer 1, the thickness of the polyester film is preferably about 5 to 20 μm, more preferably about 9 to 12 μm for further improving the moldability and electrolytic solution resistance of the battery packaging material A. The thickness of the polyamide film is preferably about 10 to 30 μm, more preferably about 12 to 25 μm for the same reason as described above. When the base material layer 1 includes a laminate of a polyester film and a polyamide film, the ratio of the thickness of the polyester film to the thickness of the polyamide film (polyester film/polyamide film) is preferably about 1/3 to 1/1 for the same reason as described above. The total thickness of the base material layer 1 is preferably about 10 to 50 μm, more preferably about 15 to 30 μm.

[Adhesive Layer 2]

In the battery packaging material A according to the first aspect, the adhesive layer 2 is a layer provided between the base material layer 1 and the metal layer 3 for strongly bonding these layers.

The adhesive layer 2 is formed from an adhesive capable of bonding the base material layer 1 and the metal layer 3. The adhesive used for forming the adhesive layer 2 may be a two-liquid curable adhesive, or may be a one-liquid curable adhesive. Further, the adhesion mechanism of the adhesive used for forming the adhesive layer 2 is not particularly limited, and may be any one of a chemical reaction type, a solvent volatilization type, a heat melting type, a heat pressing type and so on.

Specific examples of the adhesive component that can be used for forming the adhesive layer 2 include polyester-based resins such as polyethylene terephthalate, polybutylene terephthalate, polyethylene naphthalate, polybutylene naphthalate, polyethylene isophthalate, polycarbonate and copolymerized polyester; polyether-based adhesives; polyurethane-based adhesives; epoxy-based resins; phenol resin-based resins; polyamide-based resins such as nylon 6, nylon 66, nylon 12 and copolymerized polyamide; polyolefin-based resins such as polyolefins, carboxylic acid-modified polyolefins and metal-modified polyolefins, polyvinyl acetate-based resins; cellulose-based adhesives; (meth) acryl-based resins; polyimide-based resins; amino resins such as urea resins and melamine resins; rubbers such as chloroprene rubber, nitrile rubber and styrene-butadiene rubber; and silicone-based resins. These adhesive components may be used alone, or may be used in combination of two or more thereof. Among these adhesive components, polyurethane-based adhesives are preferred.

The thickness of the adhesive layer 2 is, for example, 1 to 10 μm, preferably 2 to 5 μm.

[Metal Layer 3]

In the battery packaging material A according to the first aspect, the metal layer 3 is a layer which is intended to improve the strength of the packaging material, and also functions as a barrier layer for preventing ingress of water vapor, oxygen, light and the like into the battery. In the battery packaging material A according to the first aspect, the metal layer 3 is formed of an aluminum foil having a 0.2% yield strength of 55 to 140 N/mm$^2$ when a tensile test is conducted in a direction parallel to a rolling direction. By using as the metal layer 3 an aluminum foil having a high yield strength as described above, excellent moldability can be imparted to the battery packaging material A according to the first aspect.

The aluminum foil to be used as the metal layer 3 may have a 0.2% yield strength of 55 to 140 N/mm$^2$ when a tensile test is conducted in a direction (MD) parallel to a rolling direction, but the 0.2% yield strength is preferably 65 to 90 N/mm$^2$ for imparting further excellent moldability.

The 0.2% yield strength of the aluminum foil when a tensile test is conducted in each of a direction (TD) vertical to a rolling direction or a direction at 45° to the rolling direction is not particularly limited, but is preferably about 55 to 140 N/mm$^2$, further preferably about 65 to 90 N/mm$^2$.

While the tensile rupture strength of the aluminum foil when a tensile test is conducted in a direction (MD) parallel to a rolling direction is about 90 to 130 N/mm$^2$, it is preferably about 95 to 125 N/mm$^2$, further preferably about 100 to 110 N/mm$^2$. When the aluminum foil has a tensile rupture strength as described above, excellent moldability can be further effectively imparted.

While the tensile rupture strength of the aluminum foil when a tensile test is conducted in each of a direction (TD) vertical to a rolling direction or a direction at 45° to the rolling direction is not particularly limited, but it is, for example, about 90 to 124 N/mm², preferably about 94 to 122 N/mm², further preferably about 96 to 105 N/mm².

The 0.2% yield strength, the tensile rupture strength and the tensile rupture elongation are measured by a tensile test (total elongation method) defined in JIS Z 2241.

The aluminum foil to be used as the metal layer 3 may be a foil of pure aluminum alone as long as it has the above-described 0.2% yield strength, but an aluminum alloy foil is preferred. Examples of the aluminum alloy to be used in the aluminum foil include aluminum-Fe-based alloys, aluminum-Mn-based alloys, with aluminum-Fe-based alloys being preferred. Preferred examples of the aluminum foil to be used as the metal layer 3 include foils of soft aluminum, for example annealed aluminum (JIS A8021H-O) or (JIS A8079H-O).

An aluminum foil having the above-mentioned properties is known, and a method for production thereof is also known. Specifically, an aluminum foil having the properties can be produced by passing through the steps of: homogenizing an aluminum metal or aluminum alloy at about 500 to 600° C. for about 1 to 2 hours; hot-rolling the aluminum metal or aluminum alloy at about 400 to 500° C.; cold-rolling the aluminum metal or aluminum alloy; subjecting the aluminum metal or aluminum alloy to intermediate annealing at about 300 to 450° C. for about 1 to 10 hours; cold-rolling the aluminum metal or aluminum alloy; and subjecting the aluminum metal or aluminum alloy to final annealing at about 250 to 400° C. for about 30 to 100 hours.

The thickness of the material layer 3 (aluminum foil) is preferably about 20 to 55 μm, more preferably about 30 to 40 μm.

Preferably, at least one surface, preferably both surfaces, of the metal layer 3 is subjected to a chemical conversion treatment for stabilization of bonding, prevention of dissolution and corrosion, and so on. Here, the chemical conversion treatment is a treatment for forming an acid resistance film on the surface of the metal layer. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer formed of repeating units represented by the following general formulae (1) to (4). In the aminated phenol polymer, the repeating units represented by the following general formulae (1) to (4) may be contained alone, or may be contained in combination of two or more thereof.

[Chemical Formula 1]

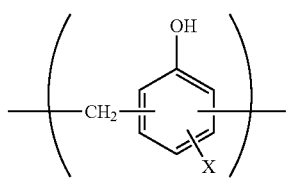

(1)

[Chemical Formula 2]

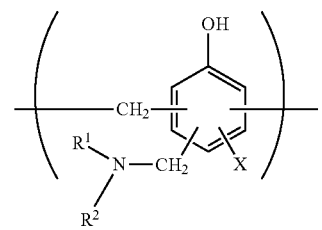

(2)

[Chemical Formula 3]

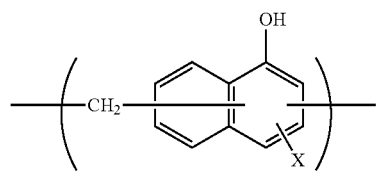

(3)

[Chemical Formula 4]

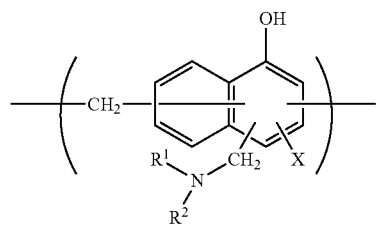

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups having 1 to 4 carbon atoms, such as a methyl group, an ethyl group, an n-propyl group, an isopropyl group, an n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer formed of repeating units represented by the general formulae (1) to (4) is, for example, about 500 to about 1000000, preferably about 1000 to about 20000.

Examples of the chemical conversion treatment method for imparting corrosion resistance to the metal layer 3 include a method in which the metal layer 3 is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal layer 3. A resin layer with a cationic polymer crosslinked with a crosslinking agent may be formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by grafting a primary amine to an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

These chemical conversion treatments may be performed alone, or may be performed in combination of two or more thereof. The chemical conversion treatments may be performed using one compound alone, or may be performed using two or more compounds in combination. Among them, a chromic acid chromate treatment is preferred, and a chromate treatment using a chromic acid compound, a phosphoric acid compound and the aminated phenol polymer in combination is further preferred.

The amount of the acid resistant film to be formed on the surface of the metal layer 3 in the chemical conversion treatment is not particularly limited, but for example, when a chromate treatment is performed using a chromic acid compound, a phosphoric acid compound and the aminated phenol polymer in combination, it is desirable that the chromic acid compound be contained in an amount of about 0.5 to about 50 mg, preferably about 1.0 to about 40 mg, in terms of chromium, the phosphorus compound be contained in an amount of about 0.5 to about 50 mg, preferably about 1.0 to about 40 mg, in terms of phosphorus, and the aminated phenol polymer be contained in an amount of about 1 to about 200 mg, preferably about 5.0 to 150 mg, per 1 $m^2$ of the surface of the metal layer.

The chemical conversion treatment is performed in the following manner: a solution containing a compound to be used for formation of an acid resistance film is applied to the surface of the metal layer by a bar coating method, a roll coating method, a gravure coating method, an immersion method or the like, and heating is then performed so that the temperature of the metal layer is about 70 to 200° C. The metal layer may be subjected to a degreasing treatment by an alkali immersion method, an electrolytic cleaning method, an acid cleaning method, an electrolytic acid cleaning method or the like before the metal layer is subjected to a chemical conversion treatment. When a degreasing treatment is performed as described above, the chemical conversion treatment of the surface of the metal layer can be further efficiently performed.

[Sealant Layer 4]

In the battery packaging material A according to the first aspect, the sealant layer 4 corresponds to the innermost layer, and during construction of a battery, the sealant layers are heat-welded to each other to hermetically seal the battery element.

The resin component to be used in the sealant layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylenes and polypropylenes are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer with the polyolefin modified by subjecting the polyolefin to block polymerization or graft polymerization with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an $\alpha,\beta$-unsaturated carboxylic acid or an anhydride thereof replacing a part of monomers that form the cyclic polyolefin, or by block-polymerizing or graft-polymerizing an $\alpha,\beta$-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, carboxylic acid-modified polyolefins are preferred, and carboxylic acid-modified polypropylene is further preferred.

The sealant layer 4 may be formed from one resin component alone, or may be formed from a blend polymer obtained by combining two or more resin components. Further, the sealant layer 4 may be formed of only one layer, but may be formed of two or more layers with the same resin component or different resin components.

While the thickness of the sealant layer 4 may be appropriately selected, it is about 10 to 100 μm, preferably about 15 to 50 μm.

[Adhesive Layer 5]

In the battery packaging material A according to the first aspect, the adhesive layer 5 is a layer that is provided between the metal layer 3 and the sealant layer 4 as necessary for strongly bonding the metal layer 3 and the sealant layer 4 to each other.

The adhesive layer 5 is formed from an adhesive capable of bonding the metal layer 3 and the sealant layer 4 to each other. The bonding mechanism, the kind of the adhesive component, and so on for the adhesive to be used for formation of the adhesive layer 5 are similar to those for the adhesive layer 2. The adhesive component to be used in the adhesive layer 5 is preferably a polyolefin-based resin, further preferably a carboxylic acid-modified polyolefin, especially preferably carboxylic acid-modified polypropylene.

The thickness of the adhesive layer 5 is, for example, about 2 to 50 μm, preferably 20 to 30 μm.

3A. Method for Producing Battery Packaging Material A According to First Aspect

The method for producing the battery packaging material A according to the first aspect is not particularly limited as long as a laminated body including layers each having a predetermined composition is obtained, and examples thereof include the following method.

First, a laminate in which the base material layer 1, the adhesive layer 2 and the metal layer 3 are laminated in this order (hereinafter, the laminate may be described as a "laminate A") is formed. Specifically, the laminate A can be formed by a dry lamination method in which an adhesive to be used for formation of the adhesive layer 2 is applied onto the base material layer 1 or the metal layer 3, the surface of which is subjected to a chemical conversion treatment as necessary, using a coating method such as an extrusion method, a gravure coating method or a roll coating method, and dried, the metal layer 3 or the base material layer 1 is then laminated, and the adhesive layer 2 is cured. When the base material layer 1 is a co-extruded laminate of a polyester resin and a polyamide resin, the laminate A can be formed by applying an adhesive onto the metal layer 3, and then co-extruding the polyester resin and the polyamide resin onto the adhesive. The laminate A may be formed from a film obtained by co-extruding a polyester resin and a polyamide resin beforehand. In co-extrusion of the polyester resin and the polyamide resin, an adhesive resin may be disposed between the polyester resin and the polyamide resin for further strengthening bonding between the polyester resin and the polyamide resin.

Then, the sealant layer 4 is laminated on the metal layer 3 of the laminate A. When the sealant layer 4 is laminated directly on the metal layer 3, a resin component that forms the sealant layer 4 may be applied onto the metal layer 3 of the laminate A by a method such as a gravure coating method or a roll coating method. When the adhesive layer 5 is provided between the metal layer 3 and the sealant layer 4, mention is made of for example, (1) a method in which the adhesive layer 5 and the sealant layer 4 are co-extruded to be laminated on the metal layer 3 of the laminate A (co-extrusion lamination method); (2) a method in which the adhesive layer 5 and the sealant layer 4 are laminated to form a laminate separately, and the laminate is laminated on the metal layer 3 of the laminate A by a thermal lamination method; (3) a method in which an adhesive for formation of the adhesive layer 5 is laminated on the metal layer 3 of the laminate A by an extrusion method or a method in which the adhesive is applied by solution coating, dried at a high temperature and baked, and the sealant layer 4 formed in a sheet shape beforehand is laminated on the adhesive layer 5 by a thermal lamination method; and (4) a method in which the melted adhesive layer 5 is poured between the metal layer 3 of the laminate A and the sealant layer 4 formed in a sheet shape beforehand, and simultaneously the laminate A and the sealant layer 4 are bonded together with the adhesive layer 5 interposed therebetween (sandwich lamination).

A laminate including the base material layer 1, the adhesive layer 2, the metal layer 3, the surface of which is subjected to a chemical conversion treatment as necessary, the adhesive layer 5 provided as necessary and the sealant layer 4 in this order is formed in the manner described above, and the laminate may be further subjected to a heating treatment of hot roll contact type, hot air type, near- or far-infrared type, or the like for strengthening the adhesion of the adhesive layer 2 and the adhesive layer 5 provided as necessary. As conditions for such a heating treatment, for example, the temperature is 150 to 250° C., and the time is 1 to 5 minutes.

In the battery packaging material A according to the first aspect, the layers that form the laminated body may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

4A. Uses of Battery Packaging Material a According to First Aspect

The battery packaging material A according to the first aspect is used as a packaging material for hermetically sealing and storing battery elements such as a positive electrode, a negative electrode and an electrolyte.

Specifically, a battery element including at least a positive electrode, a negative electrode and an electrolyte is covered with the battery packaging material A according to the first aspect such that a flange portion (region where sealant layers are in contact with each other) can be formed on the periphery of the battery element while a metal terminal connected to each of the positive electrode and the negative electrode protrudes to outside, and sealant layers at the flange portion are heat-sealed with each other to hermetically seal the battery element, thereby providing a battery using the battery packaging material A. When the battery element is stored using the battery packaging material A according to the first aspect, the battery packaging material A of the first aspect is used such that the sealant portion is on the inner side (surface in contact with the battery element).

The battery packaging material A according to the first aspect may be used for either a primary battery or a secondary battery, but it is preferably used for a secondary battery. The type of secondary battery to which the battery packaging material A according to the first aspect is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material A of the first aspect is applied include lithium ion batteries and lithium ion polymer batteries.

Figure 3:
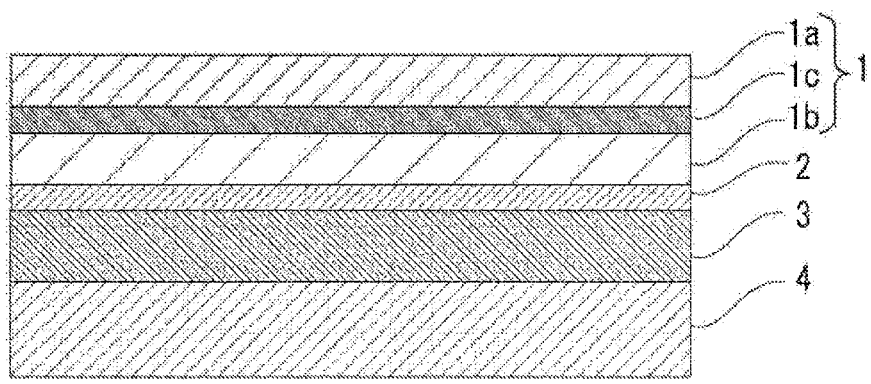
FIG. 3 is a drawing showing one example of a cross-sectional structure of a battery packaging material according to the second aspect of the present invention.

1B. Laminated Structure of Battery Packaging Material B According to Second Aspect The battery packaging material B according to the second aspect includes a laminate in which at least a base material layer 1, an adhesive layer 2, a metal layer 3 and a sealant layer 4 are laminated in this order as shown in FIG. 3. In the battery packaging material B according to the second aspect, the base material layer 1 is an outermost layer, and the sealant layer 4 is an innermost layer. That is, at the time of assembling a battery, the sealant layer 4 situated on the periphery of a battery element is heat-sealed with itself to hermetically seal the battery element, so that the battery element is encapsulated.

Figure 4:
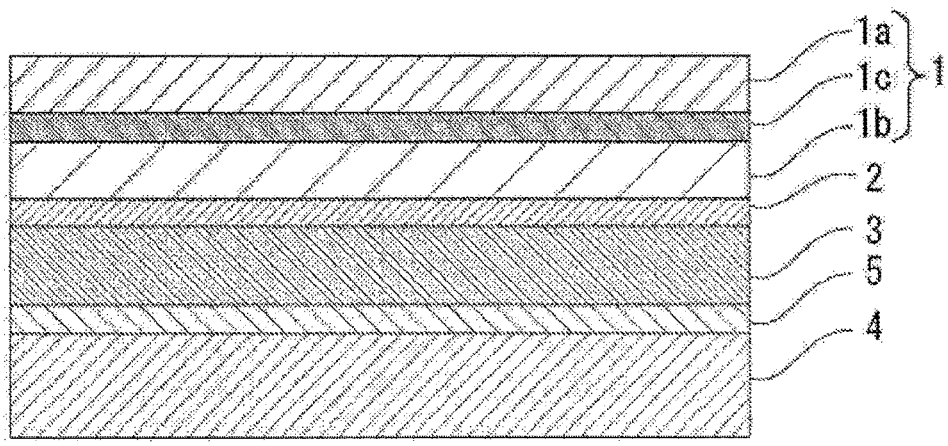
FIG. 4 is a drawing showing one example of a cross-sectional structure of a battery packaging material according to the second aspect of the present invention.

In the second aspect, the base material layer 1 includes at least a polyester resin layer 1a and a polyamide resin layer 1b. An adhesive resin layer 1c may be laminated between the polyester resin layer 1a and the polyamide resin layer 1b as necessary for the purpose of, for example, improving adhesion between these layers. Preferably, the polyester resin layer 1a is situated at an outermost layer on a side opposite to the sealant layer 4 in the base material layer 1 for improving the electrolytic solution resistance of the battery packaging material B. As shown in FIG. 4, the battery packaging material B according to the second aspect may have an adhesive layer 5 provided between the metal layer 3 and the sealant layer 4 as necessary for the purpose of improving adhesion between the layers. A coating layer may be provided on a surface (surface on a side opposite to the sealant layer 4) of the base material layer 1 although not illustrated.

2B. Compositions of Layers that Form Battery Packaging Material B According to Second Aspect

[Base Material Layer 1]

In the battery packaging material B according to the second aspect, the base material layer 1 is a layer that forms the outermost layer, and has insulation quality. In the second aspect, the base material layer 1 is formed of a biaxially stretched film including at least the polyester resin layer 1a and the polyamide resin layer 1b.

Specific examples of the polyester resin that forms the polyester resin layer 1a include polyethylene terephthalate, polybutylene terephthalate, polyethylene naphthalate, polybutylene naphthalate, copolyester and polycarbonate. Examples of the copolymerized polyester include ethylene terephthalate/ethylene isophthalate copolymers and butylene terephthalate/butylene isophthalate copolymers. The polyester resins that form the polyester resin layer 1a may be used alone, or may be used in combination of two or more thereof.

Preferably, the polyester resin layer 1a is situated at an outermost layer of the base material layer 1 on a side opposite to the sealant layer 4 for improving the electrolytic solution resistance of the battery packaging material B according to the second aspect. When the polyester resin layer 1a exists on an outermost layer of the battery packaging material B, not only dissolution but also whitening of the battery packaging material surface B in case where an electrolytic solution is deposited can be effectively suppressed.

For ensuring that the battery packaging material B according to the second aspect has both excellent moldability and excellent electrolytic solution resistance, the thickness of the polyester resin layer 1a is preferably about 1 to 15 µm, more preferably about 3 to 12 µm.

Examples of the polyamide resin that forms the polyamide resin layer 1b include nylon 6, nylon 6,6, copolymers of nylon 6 and nylon 6,6, nylon 6,10, polymethaxylyleneadipamide (MXD6), and copolymers of at least two of these resins, and among them, nylon 6 is preferred.

For ensuring that the battery packaging material B has both excellent moldability and excellent electrolytic solution resistance, the thickness of the polyamide resin layer 1b is preferably about 10 to 25 µm, more preferably about 12 to 15 µm.

For ensuring that the battery packaging material B has both excellent moldability and excellent electrolytic solution resistance, the ratio of the thickness of the polyamide resin layer 1b to the thickness of the polyester resin layer 1a (polyamide resin layer 1b/polyester resin layer 1a) is preferably about 0.8 or more, more preferably in the range of 1.2 to 5.0.

An adhesive resin layer 1c may be laminated between the polyester resin layer 1a and the polyamide resin layer 1b as necessary for the purpose of, for example, improving adhesion between these layers. When the adhesive resin layer 1c is laminated, it is preferred that the base material layer 1 is formed of a biaxially stretched film in which a polyester resin layer, an adhesive resin layer and a polyamide resin layer are laminated in this order. The resin that forms the adhesive resin layer 1c is not particularly limited as long as it can improve adhesion between the polyester resin layer 1a and the polyamide resin layer 1b, and examples thereof include modified polyester-based elastomer resins and acid-modified polyolefin resins.

The base material layer 1 may further include other layer in addition to the polyester resin layer 1a, the polyamide resin layer 1b, and the adhesive resin layer 1c provided as necessary. Examples of the other resin that forms the other layer include epoxy resins, acrylic resins, fluororesins, polyurethane resins, silicon resins, phenol resins, and mixtures and copolymers thereof.

In the second aspect, the base material layer 1 is formed of a biaxially stretched film including at least the polyester resin layer 1a and the polyamide resin layer 1b, the tensile rupture elongation of the base material layer 1 (resin film that forms the base material layer 1) in each of the MD direction and the TD direction is set in the range of 85 to 130%, and the ratio of the later-described tensile rupture elongations (MD/TD) is set in the range of 1.0 to 1.4 to obtain the battery packaging material B having both excellent electrolytic solution resistance and excellent moldability.

The mechanism in which when the base material layer 1 is formed of a biaxially stretched film including at least the polyester resin layer 1a and the polyamide resin layer 1b, and the tensile rupture elongation of the base material layer 1 in each of the MD direction and the TD direction satisfies a relationship as described above, the battery packaging material has excellent electrolytic solution resistance, and also exhibits excellent moldability with generation of pinholes, cracks and the like suppressed during molding is not necessarily clearly known in detail, but may be considered as follows. That is, it is considered that when the tensile rupture elongation of the base material layer 1 in each of the MD direction and the TD direction satisfies a relationship as described above, the stress change in the metal layer 3 during molding of the battery packaging material B can be appropriately controlled to slacken deformation (elongation) of the metal layer 3, abrupt deformation (elongation) of the battery packaging material B is suppressed. Accordingly, it is considered that during molding of the battery packaging material B, the metal layer 3 can be made to properly follow the shape of a mold, so that generation of pinholes, cracks and the like is suppressed. If the tensile rupture strength is excessively low, deformation (elongation) of the metal layer 3 is hindered, and resultantly pinholes, cracks and the like are easily generated. Conversely if the tensile rupture strength is excessively high, deformation (elongation) of the metal layer 3 cannot be suppressed, and thus pinholes, cracks and the like are easily generated. Since the base material layer 1 includes the polyester resin layer 1b, excellent electrolytic solution resistance is exhibited.

The tensile rupture elongation of the base material layer 1 in each of the MD direction and the TD direction is preferably in the range of 90 to 120% for further effectively suppressing generation of pinholes and cracks during molding to further improve moldability while imparting excellent electrolytic solution resistance to the battery packaging material B according to the second aspect. The tensile rupture elongation of the base material layer 1 is a value obtained by performing measurement using a method conforming to JIS K7127.

In the second aspect, the ratio of the tensile rupture elongation of the base material layer 1 in the MD direction to the tensile rupture elongation of the base material layer 1 in the TD direction (MD/TD) is in the range of 1.0 to 1.4. The mechanism in which when the tensile rupture elongation satisfies a relationship as described above, excellent moldability is exhibited is not necessarily clearly known, but it is considered that when the tensile rupture elongation is in this range, the balance in the MD direction/TD direction is satisfactory, and therefore more uniform deformation is achieved during molding of the battery packaging material B, so that generation of pinholes, cracks and the like is suppressed. The ratio of the tensile rupture elongation in the MD direction to the tensile rupture elongation in the TD direction (MD/TD) is preferably in the range of 1.0 to 1.3 for further effectively suppressing generation of pinholes and cracks during molding to further improve moldability while imparting excellent electrolytic solution resistance to the battery packaging material B according to the second aspect.

In the second aspect, the tensile rupture strength of the base material layer 1 in each of the MD direction and the TD direction is preferably 250 MPa or more, more preferably in the range of 260 to 290 MPa. The ratio of the tensile rupture strength of the base material layer in the MD direction to the tensile rupture strength of the base material layer in the TD direction (MD/TD) is preferably in the range of 0.8 to 1.1, more preferably in the range of 0.9 to 1.0. When the tensile rupture strength of the base material layer 1 is in a range as described above, generation of pinholes and cracks is further effectively suppressed to further improve moldability while excellent electrolytic solution resistance is exhibited. The tensile rupture strength of the base material layer 1 is a value obtained by performing measurement using a method conforming to JIS K7127.

For further improving the moldability and electrolytic solution resistance of the battery packaging material B according to the second aspect, the base material layer 1 is especially preferably a biaxially stretched film formed by co-extruding at least a polyester resin and a polyamide resin. The biaxially stretched film formed by co-extruding at least a polyester resin and a polyamide resin is obtained by, for example, heating and melting a pellet of polyester resin and a pellet of polyamide resin, and co-extruding the resins in two or more layers from a T-die. When the adhesive resin layer 1c is to be laminated between the polyester resin layer 1a and the polyamide resin layer 1b, a pellet of adhesive resin may be heated and melted, and co-extruded together with the polyester resin and the polyamide resin. A biaxially stretched film that forms the base material layer 1 is obtained by applying a sequential biaxial stretching method by a tenter method to the composite film obtained by performing co-extrusion. The properties, such as the tensile rupture elongation and tensile rupture strength, of the base material layer 1 can be controlled by adjusting the width of extrusion from a T-die, the draw ratio, the heat treatment temperature, the ratio of the thicknesses of the layers and so on in preparation of the biaxially stretched film.

Additives such as an antioxidant, a slipping agent, an antiblocking agent and a water repellant may be added to the layers that form the base material layer 1.

While the total thickness of the base material layer 1 is not particularly limited as long as a function as a base material layer is performed, and the battery packaging material B satisfies the above-mentioned properties, it is, for example, about 10 to 50 μm, preferably about 15 to 25 μm.

[Adhesive Layer 2]

In the battery packaging material B according to the second aspect, the adhesive layer 2 is a layer provided between the base material layer 1 and the metal layer 3 for strongly bonding these layers. The adhesive layer 2 of the battery packaging material B according to the second aspect is similar to the adhesive layer 2 of the battery packaging material A according to the first aspect.

[Metal Layer 3]

In the battery packaging material B, the metal layer 3 is a layer that is intended to improve the strength of the battery packaging material B, and also functions as a barrier layer for preventing ingress of water vapor, oxygen, light and the like into the battery. Concrete examples of the metal forming the metal layer 3 include aluminum, stainless and titanium, with aluminum being preferred. The metal layer 3 can be formed from a metal foil or by metal deposition, and is preferably formed from a metal foil, more preferably from an aluminum foil. From the view point of preventing generation of wrinkles, pinholes and the like in the metal layer 3 during production of the battery packaging material B, it is more preferred to form by soft aluminum foil such as annealed aluminum (JIS A8021P-O, JIS A8079P-O).

The aluminum foil to be used as the metal layer 3, the 0.2% yield strength when a tensile test is conducted in a direction parallel to the MD direction and the 0.2% yield strength when a tensile test is conducted in a direction parallel to the TD direction are each preferably in the range of 55 to 140 N/mm$^2$, more preferably in the range of 60 to 100 N/mm$^2$. The 0.2% yield strength is measured by a tensile test (total elongation method) defined in JIS Z 2241.

While the thickness of the metal layer 3 is not particularly limited as long as a function as a metal layer is performed, it may be, for example, about 10 μm to 50 μm, preferably about 20 μm to 40 μm.

Preferably, at least one surface, preferably both surfaces, of the metal layer 3 is subjected to a chemical conversion treatment for stabilization of bonding, prevention of dissolution and corrosion, and so on as in the case of the battery packaging material A according to the first aspect. The chemical conversion treatment of the metal layer 3 is similar to that for the battery packaging material A according to the first aspect.

[Sealant Layer 4]

In the battery packaging material B according to the second aspect, the sealant layer 4 corresponds to the innermost layer, and during construction of a battery, the sealant layers are heat-welded to each other to hermetically seal the battery element. The sealant layer 4 of the battery packaging material B according to the second aspect is similar to the sealant layer 4 of the battery packaging material A according to the first aspect.

[Adhesive Layer 5]

In the battery packaging material B according to the second aspect, the adhesive layer 5 is a layer that is provided between the metal layer 3 and the sealant layer 4 as necessary for strongly bonding the metal layer 3 and the sealant layer 4 to each other. The adhesive layer 5 of the battery packaging material B according to the second aspect is similar to the adhesive layer 5 of the battery packaging material A according to the first aspect.

[Coating Layer]

In each of the battery packaging material A according to the first aspect and the battery packaging material B according to the second aspect, a coating layer may be provided on the base material layer 1 (on the base material layer 1 on a side opposite to the metal layer 3) as necessary for the purpose of, for example, improving design property, electrolytic solution resistance, scratch resistance and moldability. The coating layer is a layer that is situated at an outermost layer when a battery is assembled.

The coating layer can be formed from, for example, polyvinylidene chloride, a polyester resin, a urethane resin, an acrylic resin, an epoxy resin, or the like. Preferably, the coating layer is formed from a two-liquid curable resin among the resin described above. Examples of the two-liquid curable resin that forms the coating layer include two-liquid curable urethane resins, two-liquid curable polyester resins and two-liquid curable epoxy resins. The coating layer may contain a matting agent.

Examples of the matting agent include fine particles having a particle size of about 0.5 nm to 5 μm. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an unstructured shape and a balloon shape. Specific examples of the matting agent include talc, silica, graphite, kaolin, montmorilloide, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrenes, crosslinked polyethylenes, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and dispersibility enhancing treatment.

The method for forming the coating layer is not particularly limited, and examples thereof include a method in which a two-liquid curable resin for forming the coating layer is applied to one of the surfaces of the base material layer 1. In the case where a matting agent is blended, the matting agent may be added to and mixed with the two-liquid curable resin, followed by applying the mixture.

While the thickness of the coating layer is not particularly limited as long as a function as a coating layer is performed, it is, for example, about 0.5 to 10 μm, preferably about 1 to 5 μm.

3B. Method for Producing Battery Packaging Material B According to Second Aspect The method for producing the battery packaging material B according to the second aspect is similar to the method described above in "Method for producing battery packaging material A according to first aspect". When the coating layer is provided on a surface of the base material layer 1, the coating layer is laminated on a surface of the base material layer 1 on a side opposite to the metal layer 3. The coating layer can be formed by, for example, coating a surface of the base material layer 1 with the resin that forms the coating layer. The order of the step of laminating the metal layer 3 on a surface of the base material layer 1 and the step of laminating the coating layer on a surface of the base material layer 1 is not particularly limited. For example, the coating layer may be formed on a surface of the base material layer 1, followed by forming the metal layer 3 on a surface of the base material layer 1 on a side opposite to the coating layer.

4B. Uses of Battery Packaging Material B According to Second Aspect

The uses of the battery packaging material B according to the second aspect is similar to the uses described above in "4A. Uses of battery packaging material A according to the second aspect.

EXAMPLES

The first aspect and the second aspect of the present invention will be described in detail below by showing examples and comparative examples. It is to be noted that the present invention is not limited to examples.

<Production of Battery Packaging Material According to First Aspect>

A battery packaging material including a laminate with a base material layer 1, an adhesive layer 2, a metal layer 3, an adhesive layer 5 and a sealant layer 4 laminated in this order was produced by laminating the adhesive layer 5 and the sealant layer 4 by a thermal lamination method to a laminate with the base material layer 1, the adhesive layer 2 and the metal layer 3 laminated in this order. Details of conditions for producing the battery packaging material are as shown below.

Examples 1A to 4A and Comparative Examples 1A and 2A

In Examples 1A to 4A and Comparative Examples 1A and 2A, a biaxially stretched polyethylene terephthalate film (thickness: 12 μm) was used as a resin film for forming the base material layer 1. The biaxially stretched polyethylene terephthalate film was produced in the following manner: an unstretched raw film composed of a raw material containing polyethylene terephthalate was sequentially biaxially stretched under the condition of a draw ratio of 2.0 to 6.0 in each of the machine direction (MD) and the transverse direction (TD) by a tenter method, and then heat-treated at 210 to 230° C.

The adhesive layer 2 composed of a two-liquid urethane adhesive including a polyester-based main agent and an isocyanate-based curing agent was formed in a thickness of 3 μm on a corona-treated surface of the biaxially stretched polyethylene terephthalate film, and the adhesive layer 2 was bonded (thermally laminated) to a chemically converted surface of a metal layer by pressurization and heating with the later-described aluminum foil used as the metal layer, thereby preparing a laminate with a biaxially stretched polyethylene terephthalate film, an adhesive layer and an aluminum foil laminated in this order.

Separately, an acid-modified polypropylene resin (unsaturated carboxylic acid-graft-modified random polypropylene (hereinafter, referred to as PPa) graft-modified with an unsaturated carboxylic acid) for forming the adhesive layer 5 and polypropylene (random copolymer (hereinafter, referred to as PP)) for forming the sealant layer 4 were co-extruded to prepare a two-layer co-extruded film composed of the 20 μm-thick adhesive layer 5 and the 20 μm-thick sealant layer 4.

Next, the two-layer co-extruded film was superimposed on the laminate including a biaxially stretched polyethylene terephthalate film, an adhesive layer and an aluminum foil in such a manner that the adhesive layer 5 of the two-layer co-extruded film was in contact with the metal layer (aluminum foil) of the laminate, and thermal lamination was performed by applying heat so that the temperature of the metal layer 3 was 120° C., thereby obtaining a laminate with the base material layer 1 (biaxially stretched polyethylene terephthalate film), the adhesive layer 2, the metal layer 3, the adhesive layer 5 and the sealant layer 4 laminated in this order. The obtained laminate was temporarily cooled, then heated to 180° C., and held at this temperature for 1 minute to be heat-treated, thereby obtaining a battery packaging material.

Examples 5A to 8A and Comparative Examples 3A and 4A

An adhesive layer composed of a two-liquid urethane adhesive including a polyester-based main agent and an isocyanate-based curing agent was formed in a thickness of 3 μm on a corona-treated surface of the biaxially stretched polyethylene terephthalate film (thickness: 12 μm) used in each of Examples 1A to 4A and Comparative Examples 1A and 2A, and the adhesive layer was bonded to a biaxially stretched nylon film (thickness: 15 μm) by pressurization and heating to obtain a laminate of a biaxially stretched polyethylene terephthalate film and a biaxially stretched nylon film. Next, a similar adhesive layer composed of a two-liquid urethane adhesive was formed in a thickness of 3 μm on the obtained laminate on the biaxially stretched nylon film side, and the adhesive layer was bonded to a chemically converted surface of a metal layer by pressurization and heating with the later-described aluminum foil used as the metal layer, thereby preparing a laminate with a biaxially stretched polyethylene terephthalate film, an adhesive layer, a biaxially stretched nylon film, an adhesive layer and an aluminum foil laminated in this order.

The biaxially stretched nylon film used in each of Examples 5A to 8A and Comparative Examples 3A and 4A was produced in the following manner: an unstretched raw film composed of a raw material containing nylon was simultaneously biaxially stretched under the condition of a draw ratio of 3.0 to 3.5 in each of the machine direction (MD) and the transverse direction (TD) by a tubular method, and then heat-treated at 150 to 200° C.

Separately, PPa for forming the adhesive layer 5 and PP for forming the sealant layer 4 to prepare a two-layer co-extruded film composed of the 20 μm-thick adhesive layer 5 and the 20 μm-thick sealant layer 4.

Next, the two-layer co-extruded film was superimposed on the laminate including a biaxially stretched polyethylene terephthalate film, an adhesive layer, a biaxially stretched nylon film, an adhesive layer and an aluminum foil in such a manner that the adhesive layer 5 of the two-layer co-extruded film was in contact with the metal layer (aluminum foil) of the laminate, and thermal lamination was performed by applying heat so that the temperature of the metal layer was 120° C., thereby obtaining a laminate with the base material layer 1 (biaxially stretched polyethylene terephthalate film/adhesive layer/biaxially stretched nylon film), the adhesive layer 2, the metal layer 3, the adhesive layer 5 and the sealant layer 4 laminated in this order. The obtained laminate was temporarily cooled, then heated to 180° C., and held at this temperature for 1 minute to be heat-treated, thereby obtaining a battery packaging material.

Comparative Example 5A

Except that a biaxially stretched nylon film was used in place of the biaxially stretched polyethylene terephthalate film, the same procedure as in Comparative Example 1A was carried out to obtain a laminate with the base material layer 1 (biaxially stretched nylon film), the adhesive layer 2, the metal layer 3, the adhesive layer 5 and the sealant layer 4 laminated in this order. The obtained laminate was temporarily cooled, then heated to 180° C., and held at this temperature for 1 minute to be heat-treated, thereby obtaining a battery packaging material.

As an aluminum foil for forming the metal layer 3, one obtained by subjecting to a chemical conversion treatment both the surfaces of each of AL foils 1 to 6 (thickness: 40 μm) composed of soft aluminum (JIS H4160 A8021 H-O) having properties as shown in Table 1A was used in Examples 1A to 8A and Comparative Examples 1A to 5A. The chemical conversion treatment of AL foils 1 to 6 was performed by applying to both the surfaces of the metal layer a treatment liquid including a phenol resin, a chromium fluoride compound and phosphoric acid using a roll coating method, and performing baking for 20 seconds under such conditions that the film temperature was 180° C. or higher.

TABLE 1A

|  | 0.2% Yield strength [N/mm²] | | | Tensile rupture strength [N/mm²] | | | Tensile rupture elongation [%] | | |
| --- | --- | --- | --- | --- | --- | --- | --- | --- | --- |
|  | MD direction | TD direction | 45° direction | MD direction | TD direction | 45° direction | MD direction | TD direction | 45° direction |
| AL foil 1 | 58 | 62 | 60 | 100 | 99 | 102 | 12 | 13 | 19 |
| AL foil 2 | 64 | 62 | 63 | 107 | 101 | 103 | 12 | 11 | 12 |
| AL foil 3 | 85 | 82 | 80 | 110 | 101 | 99 | 12 | 11 | 20 |
| AL foil 4 | 121 | 117 | 112 | 123 | 122 | 117 | 7 | 3 | 9 |
| AL foil 5 | 38 | 36 | 38 | 94 | 88 | 92 | 21 | 19 | 23 |
| AL foil 6 | 148 | 144 | 144 | 133 | 130 | 125 | 4 | 3 | 7 |

AL foils 1 to 6 in Table 1A were produced by passing through the steps of: homogenizing an aluminum alloy at about 500 to 600° C. for about 1 to 2 hours; hot-rolling the aluminum alloy at about 400 to 500° C.; cold-rolling the aluminum alloy; subjecting the aluminum alloy to intermediate annealing at about 300 to 450° C. for about 1 to 10 hours; cold-rolling the aluminum alloy; and subjecting the aluminum alloy to final annealing at about 250 to 400° C. for about 30 to 100 hours.

In Examples 1A to 8A and Comparative Examples 1A to 5A, the 0.2% yield strength, the tensile rupture strength and the tensile rupture elongation of each of AL foils 1 to 6 were measured by a tensile test (total elongation method) defined in JIS Z 2241. Combinations of the base material layer and the metal layer in Examples 1A to 8A and Comparative Examples 1A to 5A are shown in Table 2A.

TABLE 2A

| | Base material layer | Metal Layer |
|---|---|---|
| Example 1A | Biaxially stretched polyethylene terephthalate film | AL foil 1 |
| Example 2A | Biaxially stretched polyethylene terephthalate film | AL foil 2 |
| Example 3A | Biaxially stretched polyethylene terephthalate film | AL foil 3 |
| Example 4A | Biaxially stretched polyethylene terephthalate film | AL foil 4 |
| Example 5A | Biaxially stretched polyethylene terephthalate film/biaxially stretched nylon film | AL foil 1 |
| Example 6A | Biaxially stretched polyethylene terephthalate film/biaxially stretched nylon film | AL foil 2 |
| Example 7A | Biaxially stretched polyethylene terephthalate film/biaxially stretched nylon film | AL foil 3 |
| Example 8A | Biaxially stretched polyethylene terephthalate film/biaxially stretched nylon film | AL foil 4 |
| Comparative Example 1A | Biaxially stretched polyethylene terephthalate film | AL foil 5 |
| Comparative Example 2A | Biaxially stretched polyethylene terephthalate film | AL foil 6 |
| Comparative Example 3A | Biaxially stretched polyethylene terephthalate film/biaxially stretched nylon film | AL foil 5 |
| Comparative Example 4A | Biaxially stretched polyethylene terephthalate film/biaxially stretched nylon film | AL foil 6 |
| Comparative Example 5A | Biaxially stretched nylon film | AL foil 5 |

<Evaluation of Moldability>

The battery packaging material obtained in each of Examples 1A to 8A and Comparative Examples 1A to 5A was cut to prepare a strip piece of 120 mm×80 mm, and the strip piece was used as a test sample. The test sample was cold-molded to a molding depth of 5 mm or 6 mm using a mold of 30×50 mm. The test with a depth of 5 mm was conducted in Examples 1A to 4A and Comparative Examples 1A, 2A and 5A, and the test with a depth of 6 mm was conducted in Examples 5A to 8A and Comparative Examples 3A to 5A. Presence/absence of pinholes and cracks in the metal layer in the molded battery packaging material was checked, and the ratio (%) of generation of pinholes and cracks was calculated. The ratio of generation of pinholes and cracks was examined for 30 samples, and samples having at least one pinhole or crack were determined as being defective. The results are shown in Table 3A and Table 4A.

<Evaluation of Electrolytic Solution Resistance>

An electrolytic solution (composition of electrolytic solution: mixed liquid of ethylene carbonate, diethyl carbonate and dimethyl carbonate (1:1:1 in terms of a volume ratio) containing 1 M $LiPF_6$) was added dropwise to a surface of the base material layer of the battery packaging material obtained in each of Examples 1A to 8A and Comparative Examples 1A to 5A, and after 5 minutes, 30 minutes and 1 hour, the surface state after wiping out the electrolytic solution was observed. The evaluation criteria are as described below.

⊙: Not whitened after 1 hour.
○: Not whitened after 30 minutes.
Δ: Not whitened after 5 minutes.
X: Whitened after 5 minutes.

Table 3A shows that when molded at a molding depth of 5 mm, battery packaging materials produced using a biaxially stretched polyethylene terephthalate film as a base material layer, and using as a metal layer an aluminum foil having a high yield strength with a 0.2% yield strength of 55 to 140 N/mm² in a direction parallel to a rolling direction were remarkably inhibited from generating pinholes and cracks, and were excellent in electrolytic solution resistance (Examples 1A to 4A). On the other hand, the battery packaging materials of Comparative Examples 1A and 2A produced using an aluminum foil having 0.2% yield strengths of less than 55 N/mm² and more than 140 N/mm², respectively, were excellent in electrolytic solution resistance because a biaxially stretched polyethylene terephthalate film was used as a base material layer, but when molded at a molding depth of 5 mm, these battery packaging materials had a high ratio of generation of pinholes and cracks, and were thus inferior in moldability to the battery packaging materials of Examples 1A to 4A. The battery packaging material of Comparative Example 5A produced using only a biaxially stretched nylon film as a base material layer was poor in electrolytic solution resistance.

Table 4A shows that when molded under a more severe condition, i.e. at a molding depth of 6 mm, battery packaging materials produced using a laminate of a biaxially stretched polyethylene terephthalate film and a biaxially stretched nylon film as a base material layer, and using as a metal layer an aluminum foil having a high yield strength with a 0.2% yield strength of 55 to 140 N/mm² in a direction parallel to a rolling direction were remarkably inhibited from generating pinholes and cracks, and were excellent in electrolytic solution resistance (Examples 5A to 8A). On the other hand, the battery packaging materials of Comparative Examples 3A and 4A produced using an aluminum foil having 0.2% yield strengths of less than 55 N/mm² and more than 140 N/mm², respectively, were excellent in electrolytic solution resistance because a biaxially stretched polyethylene terephthalate film was used as a base material layer, but when molded at a molding depth of 6 mm, these battery packaging materials had a high ratio of generation of pinholes and cracks, and were thus inferior in moldability to the battery packaging materials of Examples 5A to 8A. The battery packaging material of Comparative Example 5A produced using only a biaxially stretched nylon film as a base material layer was poor in electrolytic solution resistance.

TABLE 3A

| | | Metal Layer | | | Ratio of generation of pinholes and cracks [%] | Electrolytic solution resistance |
|---|---|---|---|---|---|---|
| | | MD direction 0.2% Yield strength [N/mm$^2$] | MD direction Tensile rupture strength [N/mm$^2$] | MD direction Tensile rupture elongation [N/mm$^2$] | | |
| Example 1A | AL foil 1 | 58 | 100 | 12 | 13 | ☉ |
| Example 2A | AL foil 2 | 64 | 107 | 12 | 0 | ☉ |
| Example 3A | AL foil 3 | 85 | 110 | 12 | 0 | ☉ |
| Example 4A | AL foil 4 | 121 | 123 | 7 | 7 | ☉ |
| Comparative Example 1A | AL foil 5 | 38 | 94 | 21 | 50 | ☉ |
| Comparative Example 2A | AL foil 6 | 148 | 133 | 4 | 43 | ☉ |
| Comparative Example 5A | AL foil 5 | 38 | 94 | 21 | 0 | X |

TABLE 4A

| | | Metal Layer | | | Ratio of generation of pinholes and cracks [%] | Electrolytic solution resistance |
|---|---|---|---|---|---|---|
| | | MD direction 0.2% Yield strength [N/mm$^2$] | MD direction Tensile rupture strength [N/mm$^2$] | MD direction Tensile rupture elongation [N/mm$^2$] | | |
| Example 5A | AL foil 1 | 58 | 100 | 12 | 10 | ☉ |
| Example 6A | AL foil 2 | 64 | 107 | 12 | 0 | ☉ |
| Example 7A | AL foil 3 | 85 | 110 | 12 | 0 | ☉ |
| Example 8A | AL foil 4 | 121 | 123 | 7 | 7 | ☉ |
| Comparative Example 3A | AL foil 5 | 38 | 94 | 21 | 40 | ☉ |
| Comparative Example 4A | AL foil 6 | 148 | 133 | 4 | 37 | ☉ |
| Comparative Example 5A | AL foil 5 | 38 | 94 | 21 | 0 | X |

<Production of Battery Packaging Material According to Second Aspect>

Examples 1B to 5B and Comparative Examples 1B to 4B

First, a laminate with the base material layer 1, the adhesive layer 2 and the metal layer 3 laminated in this order was prepared using each of the following resin films A to I as a resin film for forming the base material layer 1. Specifically, the following adhesive layer 2 was formed in a thickness of 3 μm on one surface of the base material layer 1, and bonded to a chemically converted surface of the following metal layer 3 by pressurization and heating to prepare a laminate with the base material layer 1, the adhesive layer 2 and the metal layer 3 laminated in this order. In resin films A to G for forming the base material layer 1, the base material layer 1 of the polyethylene terephthalate resin layer was situated at an outermost layer on a side opposite to the sealant layer 4.

Separately, an acid-modified polypropylene resin (unsaturated carboxylic acid-graft-modified random polypropylene graft-modified with an unsaturated carboxylic acid) for forming the adhesive layer 5 and polypropylene (random copolymer) for forming the sealant layer 4 were co-extruded to prepare a two-layer co-extruded film composed of the adhesive layer 5 and the sealant layer 4. The two-layer co-extruded film was then superimposed on the prepared laminate including the base material layer 1, the adhesive layer 2 and the metal layer 3 in such a manner that the adhesive layer 5 of the two-layer co-extruded film was in contact with the metal layer of the laminate, and thermal lamination was performed by applying heat so that the temperature of the metal layer 3 was 120° C., thereby obtaining a laminate with the base material layer 1, the adhesive layer 2, the metal layer 3, the adhesive layer 5 and the sealant layer 4 laminated in this order. The obtained laminate was temporarily cooled, then heated to 180° C., and held at this temperature for 1 minute to be heat-treated, thereby obtaining a battery packaging material in each of Examples 1B to 5B and Comparative Examples 1B to 4B.
(Base Material Layer 1)
Resin Film A A co-extruded film was prepared by co-extruding a polyethylene terephthalate resin and nylon 6 by a T-die method, biaxially stretched in MD and TD directions by a sequential stretching method, and then heat-treated at 200° C. to produce a resin film A. The draw ratio was set to 3.4 in the machine direction (MD) and 3.8 in the traverse direction (TD). The laminated structure of the resin film A is that of polyethylene terephthalate (5 μm)/nylon 6 (20 μm).
Resin Films B to D, F and G A co-extruded film was prepared by co-extruding a polyethylene terephthalate resin, a thermoplastic polyester-based elastomer and nylon 6 by a T-die method, biaxially stretched in MD and TD directions by a sequential stretching method, and then heat-treated at 200° C. to produce a resin film A. The draw ratios and laminated structures of the resin films are as described below. The laminated structure of each of the resin films B to D, F and G is that of polyethylene terephthalate (5 μm)/adhesive layer (1 μm)/nylon 6 (20 μm).

Draw ratio of resin film B: 3.4 in the machine direction (MD) and 3.8 in the traverse direction (TD).

Draw ratio of resin film C: 3.6 in the machine direction (MD) and 3.6 in the traverse direction (TD).

Draw ratio of resin film D: 3.4 in the machine direction (MD) and 3.4 in the traverse direction (TD).

Draw ratio of resin film F: 3.0 in the machine direction (MD) and 3.4 in the traverse direction (TD).

Draw ratio of resin film G: 3.2 in the machine direction (MD) and 3.8 in the traverse direction (TD).

Resin Film E

An unstretched raw film formed of a raw material mainly composed of polyethylene terephthalate was sequentially biaxially stretched at a draw ratio of 3.2 in the machine direction (MD) and at a draw ratio of 3.2 in the traverse direction (TD) by a tenter method, and heat-treated at 210° C. to produce a biaxially stretched polyethylene terephthalate film, an unstretched raw film formed of a raw material mainly composed of nylon 6 was simultaneously biaxially stretched at a draw ratio of 3.0 in the machine direction (MD) and at a draw ratio of 3.3 in the traverse direction (TD) by a tubular method, and heat-treated at 200° C. to produce a biaxially stretched nylon film, and the biaxially stretched polyethylene terephthalate film and the biaxially stretched nylon film were dry-laminated by an adhesive to produce the resin film E. The laminated structure of the resin film E is that of polyethylene terephthalate (9 μm)/adhesive layer (3 μm)/nylon 6 (15 μm).

Resin Film H

An unstretched raw film formed of a raw material mainly composed of nylon 6 was simultaneously biaxially stretched by a tubular method, and then heat-treated at 200° C. to produce a nylon film. The nylon film was produced under the condition of a draw ratio of 3.0 in the machine direction (MD) and 3.3 in the traverse direction (TD). The resin film H is formed of a single nylon 6 film (25 μm).

Resin Film I

An unstretched raw film formed of a raw material mainly composed of polyethylene terephthalate was sequentially biaxially stretched by a tenter method, and then heat-treated at 210° C. to produce a PET film. The PET film was produced under the condition of a draw ratio of 3.2 in the machine direction (MD) and 3.2 in the traverse direction (TD). The resin film I is formed of a single polyethylene terephthalate film (12 μm).

(Metal Layer 3)

An aluminum foil (ALM1: 8021 material) having the properties shown below was used. The tensile rupture strength and the tensile rupture elongation are each measured by a method conforming to JIS K7127. The 0.2% yield strength is measured by a tensile test (total elongation method) defined in JIS Z 2241.

Tensile rupture strength: 102.2 MPa in MD direction and 100.9 MPa in TD direction.

Tensile rupture elongation: 9.8% in MD direction and 9.5% in TD direction.

0.2% Yield strength: 70.8 MPa in MD direction and 68.5 MPa in TD direction.

(Adhesive Layer 2)

For the adhesive layer 2 for bonding the base material layer 1 and the metal layer 3 to each other, the following adhesive was used.

A urethane resin-based adhesive obtained by mixing in a ratio of 1:3 a polyol compound having a glass transition point of −5 to 5° C., a weight average molecular weight of 10 to 40×10³ and a hydroxyl group equivalent of 0.7 to 1.9/mol and an aromatic isocyanate mainly composed of a trimethylolpropane (TMP) adduct of toluene diisocyanate (TDI)

<Measurement of Tensile Rupture Elongation and Tensile Rupture Strength>

The tensile rupture elongation and the tensile rupture strength of the obtained battery packaging material were each measured by a method conforming to JIS K7127. As measurement conditions, the sample width was 15 mm, the gauge length was 50 mm, and the tension speed was 100 mm/minute. The results are shown in Table 1B.

<Evaluation of Moldability>

The obtained battery packaging material was cut to prepare a strip piece of 120×80 mm, and the strip piece was used as a test sample. A straight mold including a rectangular male mold of 30×50 mm; and a female mold with a clearance of 0.5 mm from the male mold was provided, the test sample was placed on the female mold in such a manner that the heat-adhesive resin layer was situated on the male mold side, the test sample was pressed at a pressing pressure (surface pressure) of 0.1 MPa in such a manner that the molding depths were 7 mm and 8 mm, respectively, and cold molding (draw-in one-step molding) was performed. Presence/absence of pinholes and cracks in the metal layer in the molded battery packaging material was checked, and the ratio of occurrence (%) of pinholes and cracks was calculated. For the ratio of generation of pinholes and cracks, a test sample having at least one pinhole or crack after being molded as described above was discriminated as a molding defective product, and the ratio of molding defective products occurring at the time of molding 30 test samples under the above-mentioned conditions was determined. The results are shown in Table 1B.

<Evaluation of Electrolytic Solution Resistance>

Three cc of an electrolytic solution (obtained by adding 1 mol lithium phosphate hexafluoride to a liquid of ethylene carbonate, diethyl carbonate and dimethyl carbonate (1:1:1)) with 1000 ppm of water added thereto was added dropwise to a surface of the obtained battery packaging material on the base material layer 1 side, and after elapse of 30 minutes, the added electrolytic solution was wiped out with a wiper soaked with isopropyl alcohol (IPA), and whether the surface of the battery packaging material was whitened or not was visually checked. The results are shown in Table 1B.

TABLE 1B

| | | Base material layer | | | | | | Ratio of generation of pinholes during molding | | Electrolytic solution resistance |
|---|---|---|---|---|---|---|---|---|---|---|
| | | | Tensile rupture elongation [%] | | | Tensile rupture strength [MPa] | | | | |
| | Type | MD | TD | MD/TD | MD | TD | MD/TD | 7 mm | 8 mm | |
| Example 1B | Resin film A | 113 | 89 | 1.27 | 254 | 302 | 0.84 | 0% | 0% | ○ |
| Example 2B | Resin film B | 126 | 93 | 1.35 | 285 | 282 | 1.01 | 0% | 7% | ○ |
| Example 3B | Resin film C | 106 | 98 | 1.08 | 262 | 287 | 0.91 | 0% | 0% | ○ |
| Example 4B | Resin film D | 128 | 105 | 1.22 | 266 | 290 | 0.92 | 0% | 0% | ○ |
| Example 5B | Resin film E | 110 | 92 | 1.20 | 251 | 270 | 0.93 | 0% | 0% | ○ |

TABLE 1B-continued

| | | Base material layer | | | | | | Ratio of generation of pinholes | | Electrolytic solution resistance |
|---|---|---|---|---|---|---|---|---|---|---|
| | | Tensile rupture elongation [%] | | | Tensile rupture strength [MPa] | | | during molding | | |
| | Type | MD | TD | MD/TD | MD | TD | MD/TD | 7 mm | 8 mm | |
| Comparative Example 1B | Resin film F | 154 | 81 | 1.90 | 238 | 312 | 0.76 | 37% | 93% | ○ |
| Comparative Example 2B | Resin film G | 134 | 93 | 1.44 | 261 | 293 | 0.89 | 6% | 67% | ○ |
| Comparative Example 3B | Resin film H | 110 | 85 | 1.29 | 286 | 348 | 0.82 | 0% | 0% | X |
| Comparative Example 4B | Resin film I | 155 | 132 | 1.17 | 198 | 225 | 0.88 | 100% | 100% | ○ |

The results shown in Table 1B show that even when molded under a very severe condition, i.e. at a molding depth of 7 mm, or even 8 mm, the battery packaging materials of Examples 1B to 5B in which the base material layer 1 was formed of a biaxially stretched film including at least a polyester resin layer and a polyamide resin layer, the tensile rupture elongation of the base material layer 1 in each of the MD direction and the TD direction was in the range of 85 to 130%, and the ratio of the tensile rupture elongation of the base material layer 1 in the MD direction to the tensile rupture elongation of the base material layer 1 in the TD direction (MD/TD) was in the range of 1.0 to 1.4 had no pinholes and cracks at all, so that generation of pinholes and cracks was remarkably suppressed. The battery packaging materials of Examples 1B to 5B were also excellent in electrolytic solution resistance. On the other hand, the battery packaging materials of Comparative Examples 1B and 2B in which the base material layer 1 was formed of a biaxially stretched film including a polyester resin layer and a polyamide resin layer, but the requirement of the tensile rupture elongation was not satisfied were excellent in electrolytic solution resistance, but poor in moldability. Particularly, when the battery packaging material was molded under a very severe condition, i.e. at a molding depth of 8 mm, the ratio of generation of pinholes was very high. The battery packaging material of Comparative Example 3B in which the base material layer 1 was formed of a nylon film was quite excellent in moldability, but poor in electrolytic solution resistance. The battery packaging material of Comparative Example 4B in which the base material layer 1 was formed of polyethylene terephthalate was excellent in electrolytic solution resistance, but poor in moldability.

DESCRIPTION OF REFERENCE SIGNS

1: Base material layer
1a: Polyester resin layer
1b: Polyamide resin layer
1c: Adhesive resin layer
2: Adhesive layer
3: Metal layer
4: Sealant layer
5: Adhesive layer

The invention claimed is:

1. A battery packaging material comprising a laminate in which at least a base material layer, an adhesive layer, a metal layer and a sealant layer are laminated in this order, wherein
the base material layer includes a polyester film, and
the metal layer is an aluminum foil having a 0.2% yield strength of 55 to 140 N/mm² when a tensile test is conducted in a direction parallel to a rolling direction.

2. The battery packaging material according to claim 1, wherein the base material layer includes a laminate of a polyester film and a polyamide film.

3. The battery packaging material according to claim 2, wherein the laminate of a polyester film and a polyamide film is a laminate of a biaxially stretched polyester film and a biaxially stretched polyamide film.

4. The battery packaging material according to claim 2, wherein the laminate of a polyester film and a polyamide film is a co-extruded laminate of a polyester resin and a polyamide resin.

5. The battery packaging material according to claim 1, wherein the aluminum foil has a 0.2% yield strength of 65 to 90 N/mm² when a tensile test is conducted in a direction parallel to a rolling direction.

6. The battery packaging material according to claim 1, wherein the aluminum foil has a thickness of 20 to 55 μm.

7. A battery packaging material comprising a laminate in which at least a base material layer, an adhesive layer, a metal layer and a sealant layer are laminated in this order, wherein
the base material layer is formed of a biaxially stretched film including at least a polyester resin layer and a polyamide resin layer,
the tensile rupture elongation of the base material layer in each of the MD direction and the TD direction is in the range of 85 to 130%, and
the ratio of the tensile rupture elongation of the base material layer in the MD direction to the tensile rupture elongation of the base material layer in the TD direction (MD/TD) is in the range of 1.0 to 1.4.

8. The battery packaging material according to claim 7, wherein the base material layer is formed of a biaxially stretched film formed by co-extruding at least a polyester resin and a polyamide resin.

9. The battery packaging material according to claim 7, wherein the base material layer is formed of a biaxially stretched film in which a polyester resin layer, an adhesive resin layer and a polyamide resin layer are laminated in this order.

10. The battery packaging material according to claim 7, wherein in the base material layer, the polyester resin layer is situated at an outermost layer on a side opposite to the sealant layer.

11. The battery packaging material according to claim 7, wherein the tensile rupture strength of the base material layer in each of the MD direction and the TD direction is 250 MPa or more.

12. The battery packaging material according to claim 7, wherein the ratio of the tensile rupture strength of the base material layer in the MD direction to the tensile rupture strength of the base material layer in the TD direction (MD/TD) is in the range of 0.8 to 1.1.

13. The battery packaging material according to claim 7, wherein the metal layer is an aluminum foil in which the 0.2% yield strength when a tensile test is conducted in a direction parallel to the MD direction and the 0.2% yield strength when a tensile test is conducted in a direction parallel to the TD direction are each in the range of 55 to 140 N/mm$^2$.

14. The battery packaging material according to claim 1, wherein at least one surface of the metal layer is subjected to a chemical conversion treatment.

15. The battery packaging material according to claim 1, wherein the battery packaging material is a packaging material for a secondary battery.

16. A battery comprising a battery element which includes at least a positive electrode, a negative electrode and an electrolyte, the battery element being stored in the battery packaging material according to claim 1.

17. The battery packaging material according to claim 7, wherein at least one surface of the metal layer is subjected to a chemical conversion treatment.

18. The battery packaging material according to claim 7, wherein the battery packaging material is a packaging material for a secondary battery.

19. A battery comprising a battery element which includes at least a positive electrode, a negative electrode and an electrolyte, the battery element being stored in the battery packaging material according to claim 7.

* * * * *